(12) United States Patent
Black

(10) Patent No.: US 6,938,906 B1
(45) Date of Patent: Sep. 6, 2005

(54) BABY STROLLER WITH ENGAGEABLE LOCKING DEVICE

(76) Inventor: Patrick T Black, 6 Brookside Dr., Huntington, NY (US) 11743

( * ) Notice: Subject to any disclaimer, the term of this patent is extended or adjusted under 35 U.S.C. 154(b) by 0 days.

(21) Appl. No.: 10/779,871

(22) Filed: Feb. 17, 2004

(51) Int. Cl.[7] .............................................. B62B 7/00
(52) U.S. Cl. .............................. 280/47.38; 280/47.35; 280/209
(58) Field of Search .......................... 280/47.38, 47.35, 280/203, 204, 209, 647, 658

(56) References Cited

U.S. PATENT DOCUMENTS

| | | | |
|---|---|---|---|
| 1,707,186 A | | 3/1929 | Chatfield |
| 4,222,132 A | | 9/1980 | Crim et al. |
| 4,288,089 A | | 9/1981 | Thiessen |
| 4,354,689 A | * | 10/1982 | Perego .................. 280/47.371 |
| 4,805,938 A | * | 2/1989 | Redmond et al. ........ 280/47.35 |
| 4,969,656 A | | 11/1990 | Clausen |
| 5,064,209 A | * | 11/1991 | Kurschat ..................... 280/204 |
| 5,076,599 A | * | 12/1991 | Lockett et al. .............. 280/204 |
| 5,522,121 A | * | 6/1996 | Fraynd et al. ................ 24/335 |
| 5,653,460 A | * | 8/1997 | Fogarty ...................... 280/642 |
| 5,918,892 A | * | 7/1999 | Aaron et al. ............. 280/47.38 |
| 6,086,087 A | * | 7/2000 | Yang .......................... 280/658 |
| 6,527,294 B1 | * | 3/2003 | Brewington et al. ........ 280/647 |
| 6,752,405 B1 | * | 6/2004 | Wright .................... 280/47.38 |

FOREIGN PATENT DOCUMENTS

GB          2.152.447        8/1985

* cited by examiner

Primary Examiner—J. Allen-Shriver
(74) Attorney, Agent, or Firm—Michael I Kroll

(57) ABSTRACT

An apparatus for a convertible front 12 and rear 14 stroller having a pivotal locking device 22, 24 fastened to the stroller legs 18, 20 whereby the front and rear stroller can be removably fixedly attached thereto. The tandem strollers 12, 14 perform as a single stroller and can easily be separated to function as independent strollers. The connectors 22, 24 can be stowed against frame members 18, 20 when desirable using a locking pin 40.

7 Claims, 9 Drawing Sheets

BABY STROLLER WITH ENGAGEABLE LOCKING DEVICE

BACKGROUND OF THE INVENTION

1. Field of the Invention

The present invention relates generally to infant stroller and, more specifically, to a stroller having a pivotal locking device fastened to the stroller legs whereby another stroller having a similar locking device can be fixedly attached thereto. The tandem strollers perform as a single stroller and can easily be separated to function as independent strollers.

2. Description of the Prior Art

There are other carriage devices designed for toddlers. Typical of these is U.S. Pat. No. 1,707,186 issued to Chatfield on Mar. 26, 1929.

Another patent was issued to Crim, et al. on Sep. 16, 1980 as U.S. Pat. No. 4,222,132. Yet another U.S. Pat. No. 4,288,089 was issued to Thiesson on Sep. 8, 1981 and still yet another was issued on Feb. 21, 1989 to Redmond, et al. as U.S. Pat. No. 4,805,938.

Another patent was issued to Clausen on Nov. 13, 1990 as U.S. Pat. No. 4,969,656. Yet another U.S. Pat. No. 5,522,121 was issued to Fraynd, et al. on Jun. 4, 1996. Another was issued to Aaron et al. on Jul. 6, 1999 as U.S. Pat. No. 5,918,892 and still yet another was issued on Jul. 11, 2000 to Yang as U.S. Pat. No. 6,086,087.

Another patent was issued to Brewington, et al. on Mar. 4, 2003 as U.S. Pat. No. 6,527,294. Yet another U.K. Patent No. GB 2 152 447 was issued to Giordani on Aug. 7, 1985.

U.S. Pat. No. 1,707,186

Inventor: R. H. Chatfield

Issued: Mar. 26, 1929

A carriage having extendible axles for also supporting a go-cart when in extended positions, and an extendible handle for connection with the go-cart when in extended position.

U.S. Pat. No. 4,222,132

Inventor: Paul E. Crim, et al.

Issued: Sep. 16, 1980

An apparatus for transporting a patient from a zone having one level or type of contamination to a zone having a lesser level of such contamination, while minimizing the likelihood of contamination from the first zone being carried by the transport apparatus into the second zone. The apparatus includes a patient transport stretcher provided with means for locking it in end-to-end relationship with a wheeled surgical bed. The bed and stretcher are provided with rollers by which a patient-carrying litter may be easily moved from one to the other.

U.S. Pat. No. 4,288,089

Inventor: Henry F. Thiessen

Issued: Sep. 8, 1981

This invention is an attachment apparatus operable to interconnect two bicycle members in a side-by-side relationship. The attachment apparatus includes a main support coupling means to interconnect the bicycle members and a steering coordinator means to interconnect the steering mechanism on each bicycle member. The main support coupling means is connected to each steering post housing on each bicycle member to permit a constant distance between each bicycle member while permitting relative rotation therebetween. The steering coordinator means interconnects the turning forks on each bicycle member to assure joint and same turning of each front wheel member when steering the bicycle members.

U.S. Pat. No. 4,805,938

Inventor: Thomas Redmond, et al.

Issued: Feb. 21, 1989

A device is provided for connecting two baby strollers together consisting of a pair of bracket units spaced apart and clamped between frames of the baby strollers so that one person can operate the strollers simultaneously for transporting two babies therein.

U.S. Pat. No. 4,969,656

Inventor: Kenneth A. Clausen

Issued: Nov. 13, 1990

This stroller has a series of seats at cut-out areas in a tray supported on columns secured to a wheeled floor panel. A tongue is also secured to the floor panel, the entire assembly being marketable as a kit of an easily assembled components. The seats are slings of fabric, the ends of which traverse slots in the tray. These are secured with dowels engaging loops in the fabric above the tray. The slots are enlarged on the top surface of the tray to retain the dowels against endwise slippage.

U.S. Pat. No. 5,522,121

Inventor: Saul Fraynd, et al.

Issued: Jun. 4, 1996

A device is provided for engaging and disengaging any two baby strolling devices consisting of two components spaced apart and coupled by a snap release connector. When mounted between the frames of any two baby strolling devices (given that it can rotate at any angle), instandem allows any one person to operate the two strolling devices simultaneously as well as.

U.S. Pat. No. 5,918,892

Inventor: Christine Aaron, et al.

Issued: Jul. 6, 1999

A device for use in conjunction with strollers for securely connecting single strollers together, allowing two or more children, to be safely and effectively transported. The stroller connecting device(s) are easily detachable. The apparatus comprises an adjustable supporting member with a clamping, or other fastening, mechanism at each end. The clamping mechanisms, generally, have two jaws, rotatably connected to one another to grasp and lock a stroller shaft. The fastening mechanism preferably fastens securely onto the shafts of the strollers, providing stable operation during movement. Each jaw, of the fastening mechanism, receives and firmly grasps one shaft of the stroller. The support is preferably comprised of two tubes, with the relative position of the tubes to one another being adjustable, and thus, allowing the distance from one stroller to the other to be variable. Together, the supporting member and fastening mechanisms allow the connecting apparatus to securely, safely and rigidly connect two or more strollers. The stroller connecting devices are generally placed in two of three locations on the shafts of each stroller. Usually, two connecting devices are sufficient to provide the necessary control and stability.

U.S. Pat. No. 6,086,087

Inventor: Chih-Huang Yang

Issued: Jul. 11, 2000

A multi-seat stroller includes a stroller frame having a front wheel-carrying portion, a rear wheel-carrying portion spaced apart from the front wheel-carrying portion in a longitudinal direction and mounted with a rear footrest member, and a seat-mounting portion extending in the longitudinal direction between the front and rear wheel-carrying portions. Each of a non-detachable seat member and a detachable seat member has a backrest portion and a horizontal seat portion provided with a retaining unit for mounting pivotally the backrest portion on the seat portion such that the backrest portion can be selectively disposed in one of a folded state, where the backrest portion overlies the seat portion, and an extended state, where the backrest portion extends vertically from the seat portion. The seat portion of the non-detachable seat member is mounted fixedly on the seat-mounting portion of the stroller frame, whereas the seat portion of the detachable seat member is movably disposed on the seat-mounting portion so as to be spaced apart from the non-detachable seat member in the longitudinal direction. A seat-locking unit is provided on the seat-mounting portion of the stroller frame for retaining removably the seat portion of the detachable seat member on the seat-mounting portion.

U.S. Pat. No. 6,527,294

Inventor: Mark Everett Brewington, et al.

Issued: Mar. 4, 2003

A convertible tandem stroller includes a releasable lateral and longitudinal coupling system for permitting cojoint and independent movement of a pair of strollers. The coupling system does not have to be removed and stowed for independent operation. To permit compact lateral coupling of the strollers, one of the front wheels may be raised during tandem operation by a hinge assembly and tethering connector.

U.K. Patent Number 2,152,447

Inventor: Gloria Giordani, et al.

Issued: Aug. 7, 1985

Pushchair with a reclinable backrest, characterized by the fact that it comprises a frame, a seat having the said backrest supported on a first structure connected to the said frame, a base, two side walls supported on a second structure hinged to the said first structure in such a manner as to adjust the angle of the latter in relation to the said second structure, and a body for each of the said side walls for connecting the said backrest to the respective said side wall and so enabling various angular adjustments to be made to the said backrest.

While these strollers may be suitable for the purposes for which they were designed, they would not be as suitable for the purposes of the present invention, as hereinafter described.

SUMMARY OF THE PRESENT INVENTION

The present invention discloses a front and rear stroller having a pivotal locking device fastened to the stroller legs whereby the front and rear stroller can be removably fixedly attached thereto. The tandem strollers perform as a single stroller and can easily be separated to function as independent strollers. The connectors can be stowed against the frame members when desirable using a locking pin. The prior art currently provides for the purchase of a side by side double stroller without consideration of whether the user already possesses one stroller. The present invention provides means whereby parents can purchase a single stroller having a locking element forming an integral part therewith and if a second stroller is needed, another stroller having the locking element can be purchased and joined with the first to form a tandem stroller, which can be easily detached at the user discretion.

A primary object of the present invention is to provide a stroller having means for engaging a second similar stroller and becoming locked thereto.

Another object of the present invention is to provide a stroller having pivotal members fastened to the leg elements of said stroller.

Yet another object of the present invention is to provide a stroller wherein said pivotal members form one part of a locking device.

Still yet another object of the present invention is to provide a stroller wherein said locking device provides means whereby similar locking device strollers are tandem when engaged.

Another object of the present invention is to provide a stroller that when joined with another stroller having the locking device the strollers perform as a single stroller.

Yet another object of the present invention is to provide means whereby a user can selectively attach or detach a first and second stroller.

Additional objects of the present invention will appear as the description proceeds.

The present invention overcomes the shortcomings of the prior art by providing a stroller having a pivotal locking device fastened to the stroller legs whereby another stroller having a similar locking device can be fixedly attached thereto. The tandem strollers perform as a single stroller when attached and can easily be separated to function as independent strollers.

The foregoing and other objects and advantages will appear from the description to follow. In the description reference is made to the accompanying drawing, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
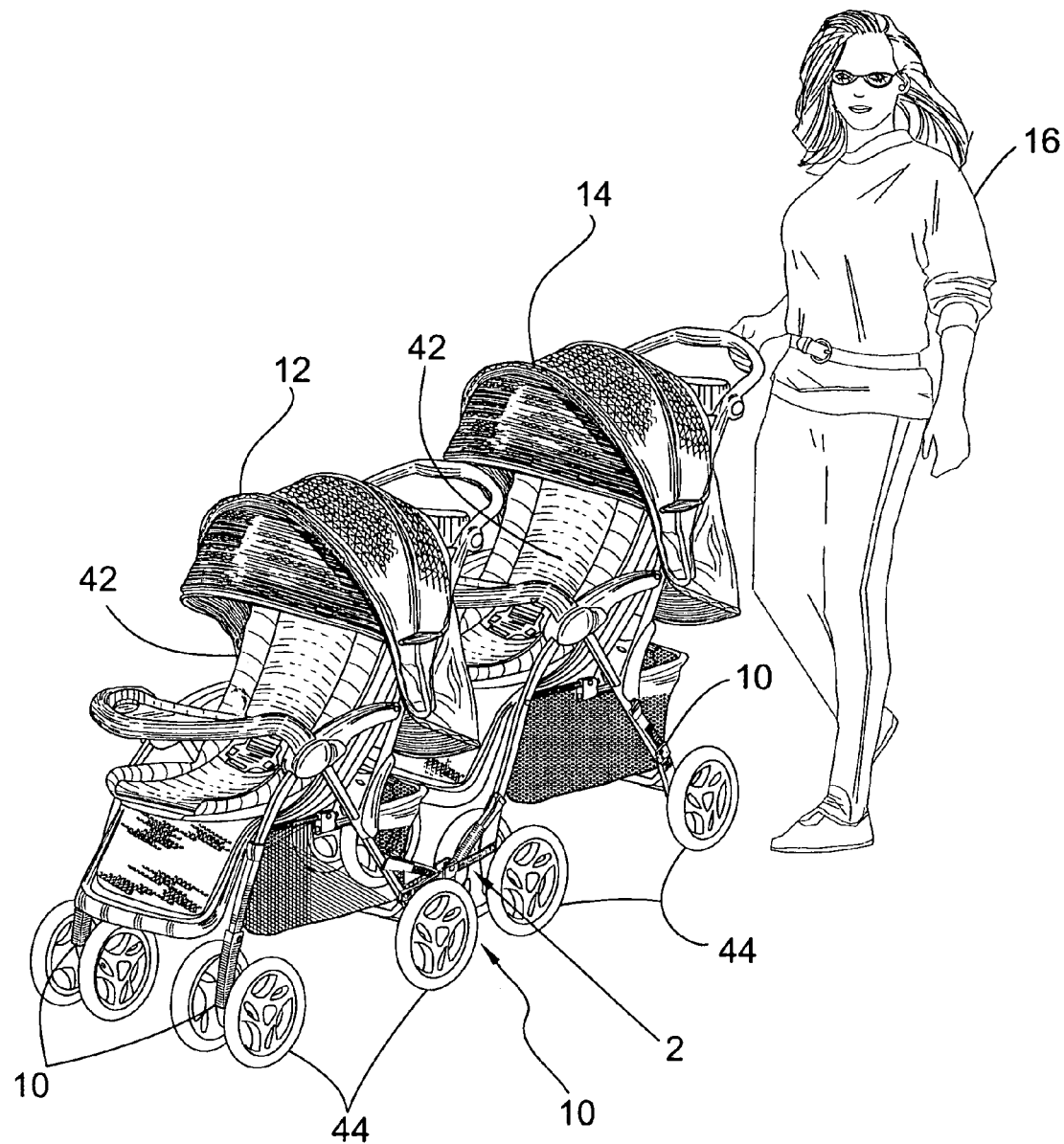
FIG. 1 is an illustrative view of the present invention in use.

With regard to reference numerals used, the following numbering is used throughout the present invention drawings.

10 present invention
12 front stroller
14 rear stroller
16 user
18 rear frame member
20 front frame member
22 first coupling member
24 second coupling member
26 sliding support member
28 securing pin
30 pivot pin
32 coupling
34 spring
36 frame apertures
38 aperture
40 locking pin
42 child compartment
44 wheels

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a convertible tandem stroller with a releasable longitudinal coupling system therein for permitting conjoined and independent movement of multiple strollers 12, 14 which can be controlled by one user 16. The coupler of the present invention 10 is shown attached to the left and right, front and rear frame members of strollers 12, 14 with each stroller having a child carrying compartment 42 and wheels 44.

Figure 2:
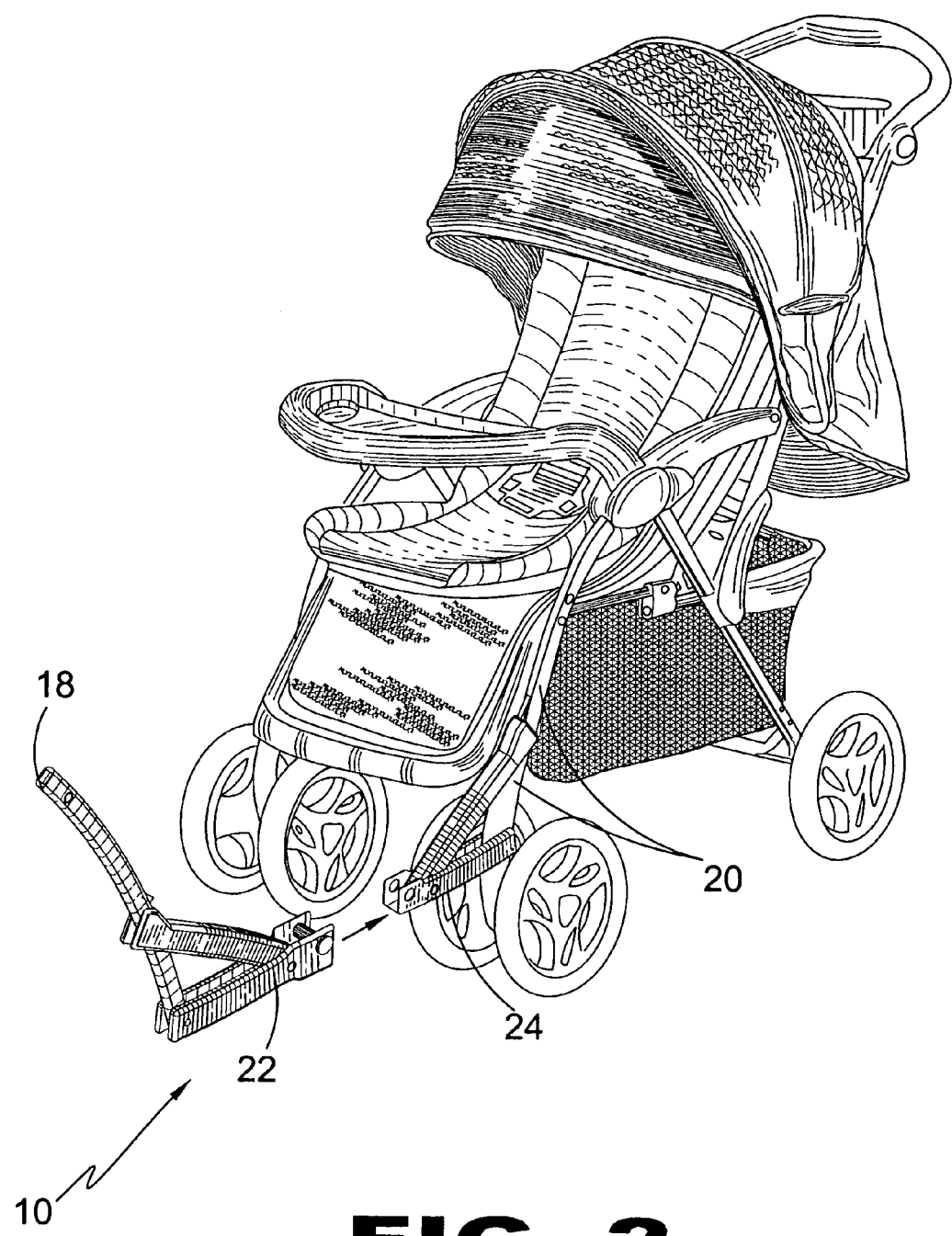
FIG. 2 is an illustrative view of the present invention in use.

Turning to FIG. 2, shown therein is an illustrative view of the present invention 10 in use. The present invention 10 discloses a convertible tandem stroller with a releasable longitudinal coupling system therein for permitting conjoined and independent movement of multiple strollers herein showing rear stroller 14. Also shown are the rear frame member 18 of the front stroller, the front frame member 20 of the rear stroller 14, the first coupling member or rear connection support member 22 and the second coupling member or front connection support member 24.

Figure 3:
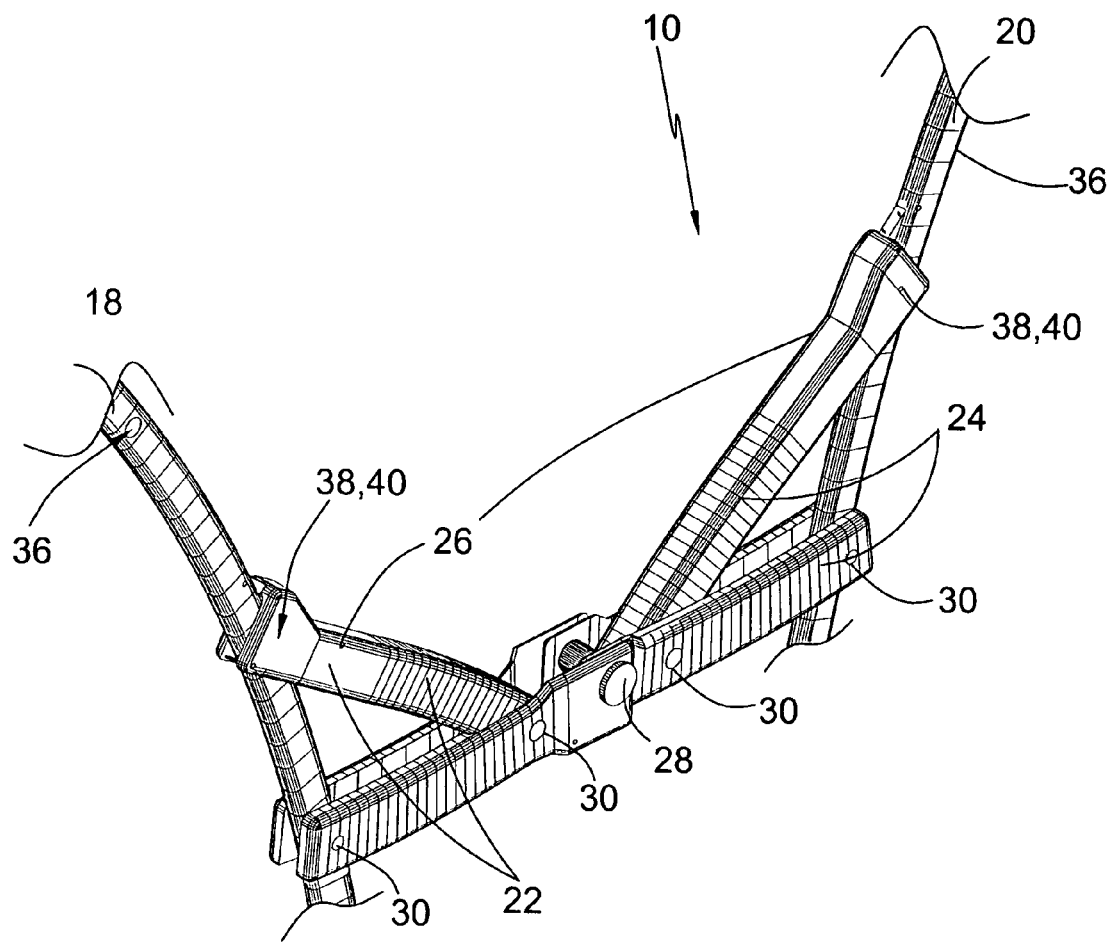
FIG. 3 is an illustrative view of the present invention in use.

Turning to FIG. 3, shown therein is an illustrative view of the present invention 10 in use. The present invention 10 discloses a convertible tandem stroller with a releasable longitudinal coupling system therein for permitting conjoined and independent movement of multiple strollers. Shown are the rear frame member 18 of the front stroller, the front frame member 20 of the rear stroller, the rear connection support member 22 and the front connection support member 24. Also shown are front and rear sliding support members 26 with aperture 38 along with the slidable, removable securing pin 28 and corresponding apertures. Also shown are front and rear frame apertures 36 and multiple pivot pins 30 and corresponding apertures. Locking pin 40 is placed in aperture 38 to lock member 26 in place. The frame members 18, 20 each have first 30, second 38, and third 36 transverse frame apertures therein.

Figure 4:
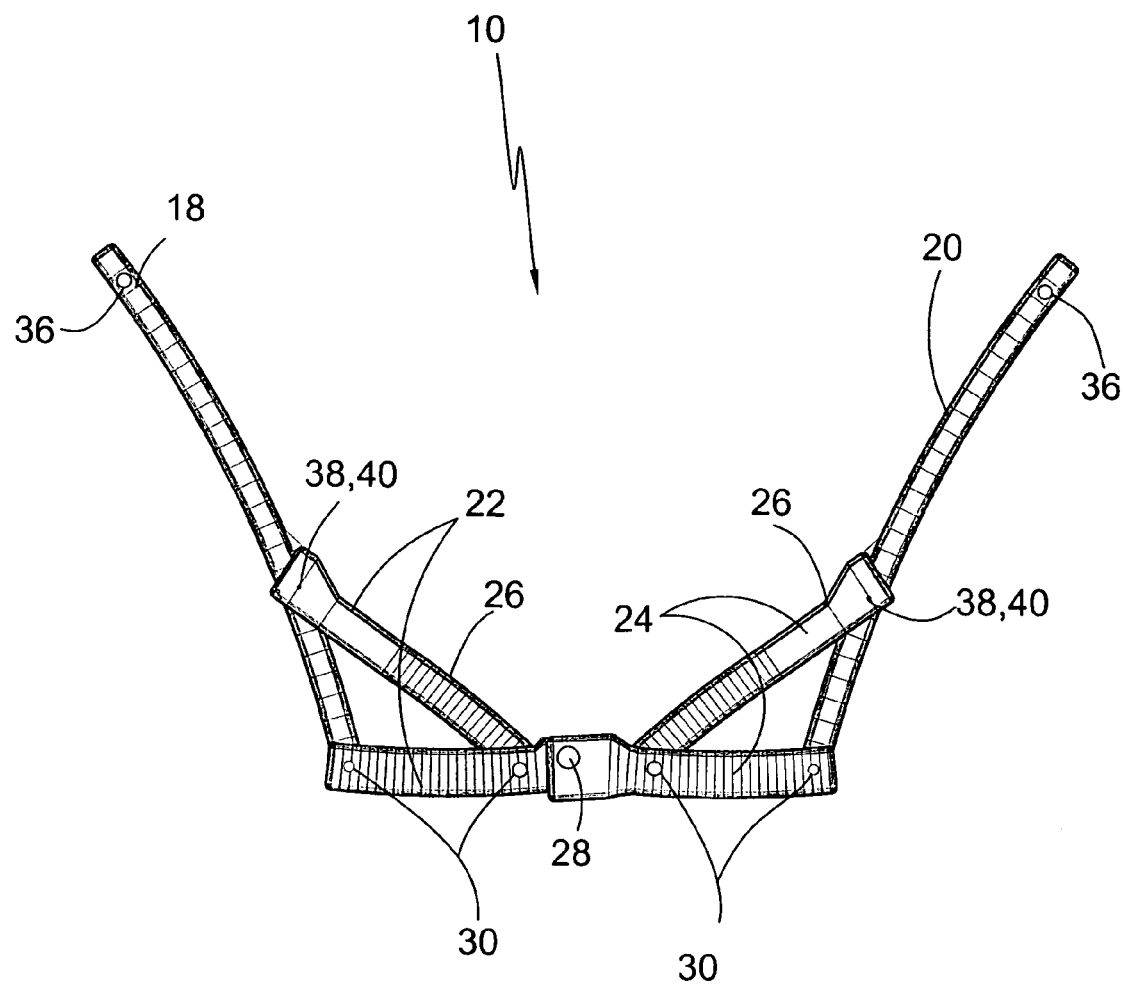
FIG. 4 is a side view of the present invention.

Turning to FIG. 4, shown therein is a side view of the present invention 10. The present invention 10 discloses a convertible tandem stroller with a releasable longitudinal coupling system therein for permitting conjoined and independent movement of multiple strollers. Shown are the rear frame member 18 of the front stroller, the front frame member 20 of the rear stroller, the rear connection support member 22 and the front connection support member 24. Also shown are the sliding support members 26 with aperture 38 along with the slidably removable securing pin 28. Also shown are multiple pivot pins 30 and frame apertures 38 which mates with aperture 38 and receives a locking pin 40.

Figure 5:
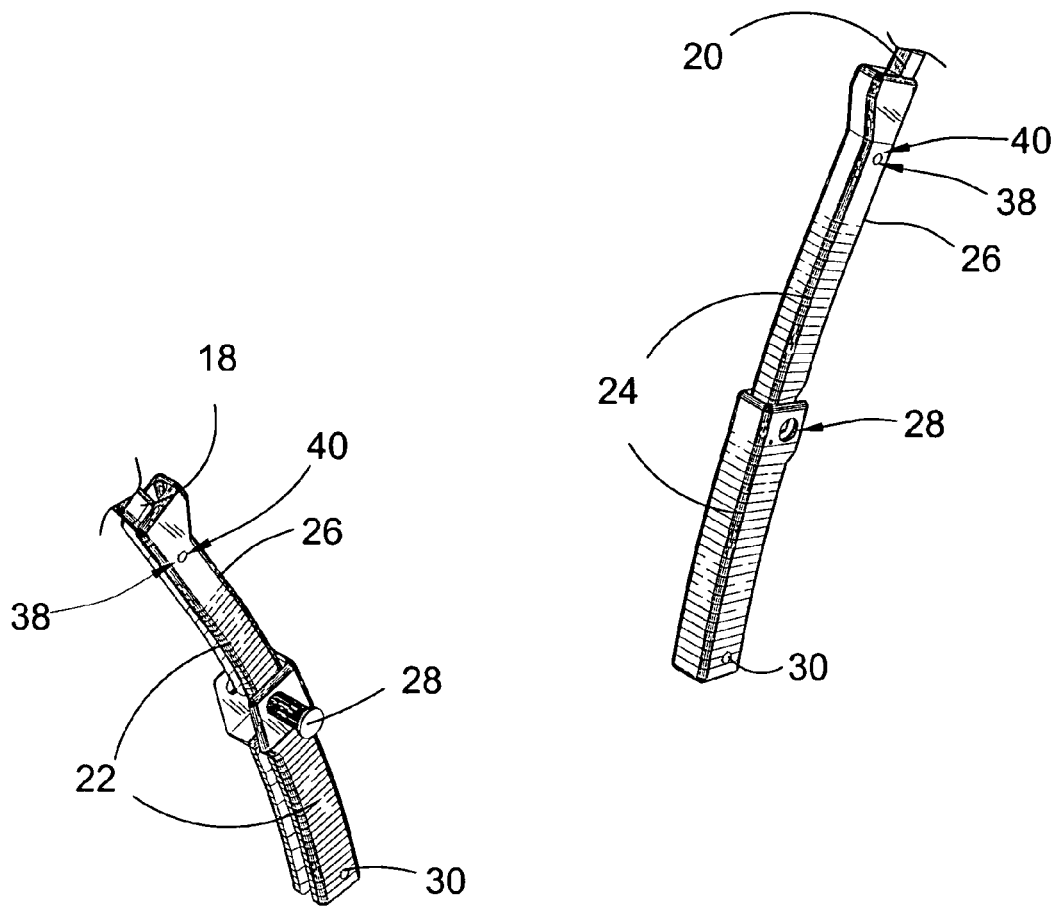
FIG. 5 is a perspective view of the present invention.
Figure 6:
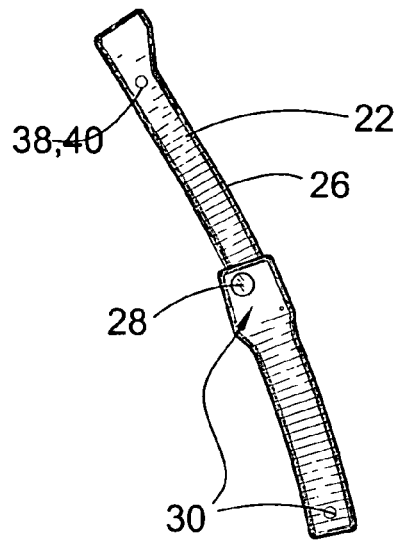
FIG. 6 is a side view of the present invention.
Figure 6:
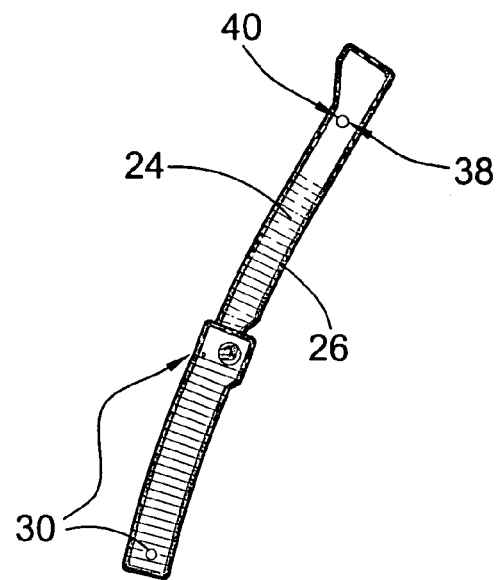
Figure 7:
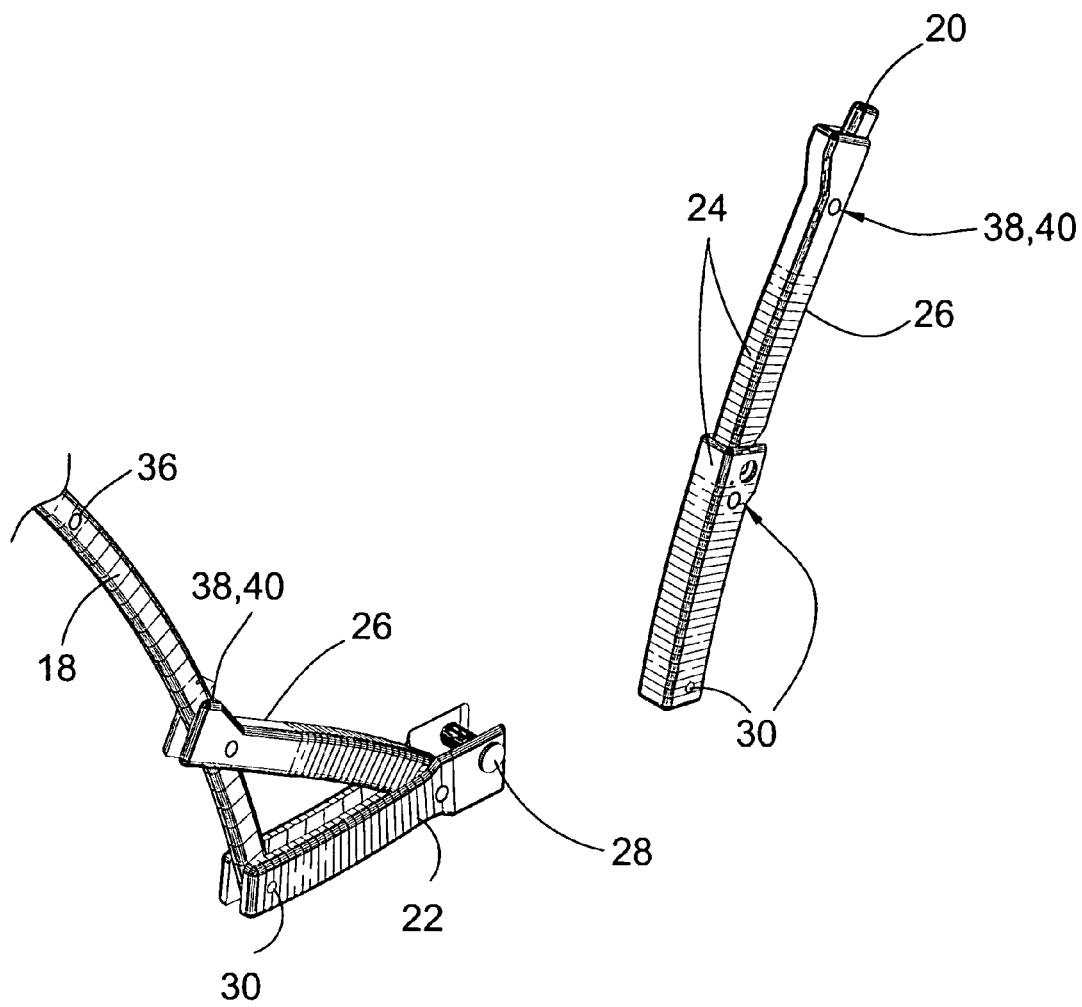
FIG. 7 is a perspective view of the present invention.

Turning to FIG. 5, shown therein is a perspective view of the present invention. The present invention discloses a convertible tandem stroller with a releasable longitudinal coupling system therein for permitting conjoined and independent movement of multiple strollers. Shown are the rear frame member 18 of the front stroller, the front frame member 20 of the rear stroller, the rear connection support member 22 in the stowed position and the front connection support member 24 in the stowed position. Also shown are pivot pins 30 and securing pin 28 partially removed from its aperture. Also shown is sliding member 26 with aperture 38. By way of comparison, FIGS. 3 and 4 show the present invention 10 in a first operative position with rear connection 22 and front connection being coupled at 28 to each other with each having a horizontal member coupled together at 28 and an angled member 26; whereas, FIGS. 5, 6 and 7 show the members 22, 24 in a second stowed position against the frame members 18, 20. In the stowed position, a locking pin 40 would be inserted through apertures 36, 38 so as to lock sliding support member 26 to the frame members 22, 24. Securing pin 28 is removed when the members 22, 24 are in the stowed position and secured in place when the members 22, 24 are coupled together.

Turning to FIG. 6, shown therein is a side view of the present invention. The present invention discloses a convertible tandem stroller with a releasable longitudinal coupling system therein for permitting conjoined and independent movement of multiple strollers. Also shown are stowed rear connection 22, stowed front connection 24, pivot pins 30, and securing pins 28. Also shown are member 26 and aperture 38 for receiving locking pin 40.

Turning to FIG. 7, shown therein is a perspective view of the present invention. The present invention discloses a convertible tandem stroller with a releasable longitudinal coupling system therein for permitting conjoined and independent movement of multiple strollers. Shown are the rear frame member 18 of the front stroller, the front frame member 20 of the rear stroller, the rear connection support member 22 and the stowed front connection support member 24. Also shown is the sliding support member 26 with aperture 38 for receiving locking pin 40 along with the removable securing pin 28. Also shown are pivot pins 30 and frame aperture 36.

Figure 8:
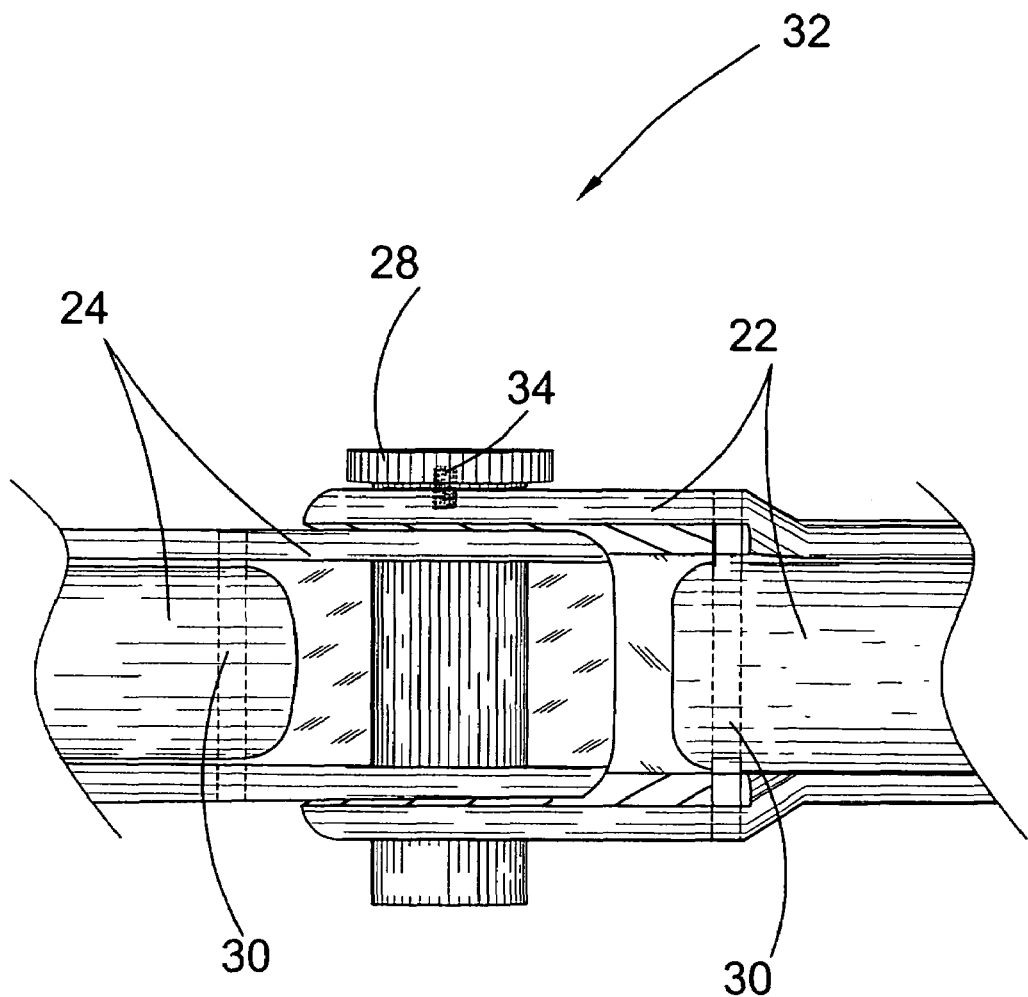
FIG. 8 is a top view of the coupling in the locked position and the spring collapsed.

Turning to FIG. 8, shown therein is a top view of the coupling 32 in the locked position and the spring 34 collapsed. The present invention discloses a convertible tandem stroller with a releasable longitudinal coupling system 32 therein for permitting conjoined and independent movement of multiple strollers. Also shown are front 24 and rear 22 connections, pivot pins 30, and securing pin 28.

Figure 9:
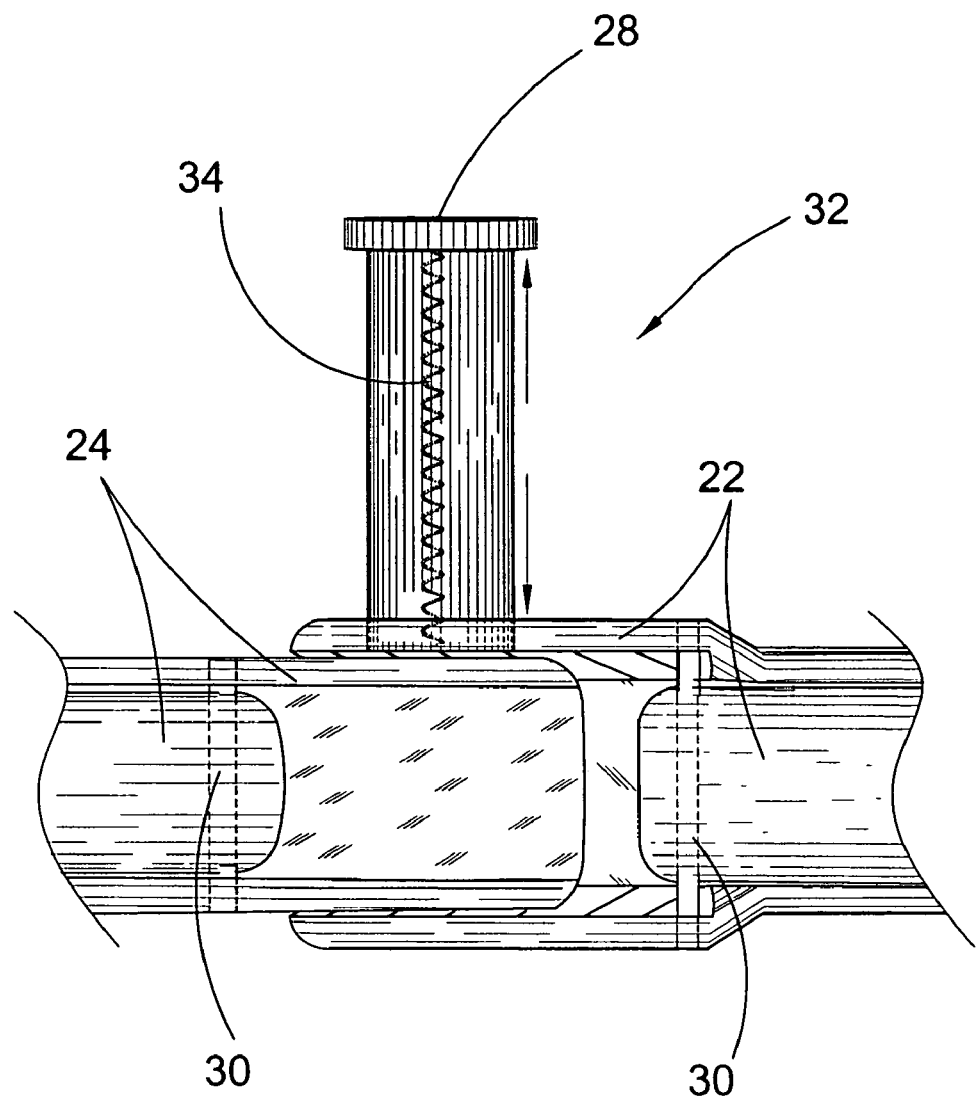
FIG. 9 is a top view of the coupling in the open position and the spring extended.

Turning to FIG. 9, shown therein is a top view of the coupling 32 in the open position and the spring 34 extended. The present invention discloses a convertible tandem stroller with a releasable longitudinal coupling system 32 therein for permitting conjoined and independent movement of multiple strollers. Also shown are front 24 and rear 22 connections, pivot pins 30, and securing pin 28.

I claim:

1. A convertible tandem baby stroller having a first baby stroller with a coupling thereon for removably joining a second baby stroller thereto, comprising:
    a) said first and second baby stroller each having a child-carrying compartment supported by a frame, said frame having left and right, front and rear frame members, each of said frame members having ground engaging wheels thereon to permit the baby stroller to be rolled about, each of said frame members having first, second and third transverse apertures therein wherein said first, second and third frame apertures are spaced apart along said frame members with said first frame aperture being closest to the ground and said third frame aperture being the farthest from the ground; and,
    b) means for coupling said baby strollers together whereby the front of the first stroller can be secured to the rear of the second stroller and operated as a single stroller and then the first and second strollers can be disconnected from each other and each operated as individual strollers, wherein said means for coupling comprises:
        i) a first coupling member disposed on each of said rear frame members adapted for removable connection to a second coupling member disposed on each of said front frame members, and,
        ii) wherein said first and second coupling members each have a first operational position and a second stowed position wherein said first and second coupling members can be moved from said first operational position to said second stowed position.

2. The baby stroller of claim 1, wherein each of said first and second coupling members further comprise:
    a) a first connection member having first and second opposing ends, wherein said first connection member is substantially horizontal when said first and second coupling members are in said first operational position;
    b) wherein said first end of each said first connection member has a first transverse pivot aperture therein for being operatively aligned with each of said first frame apertures, wherein a first pivot pin is disposed in said first pivot apertures wherein said first connection member can pivot on said first pivot pin; and,
    c) wherein each of said second ends of each said first connection member has a second transverse securing aperture therein, wherein each of said second securing apertures mate with each other so as to be in operative alignment further comprising a removable securing pin for insertion into said second securing aperture wherein said first and second coupling members can be removably fixed to each other to permit the first and second baby strollers to be removably fixed to each other; and,
    d) wherein each of said first connection members has a third pivot aperture therein, wherein said third pivot aperture is disposed between said first pivot aperture and said second securing apertures adjacent said second securing aperture.

3. The baby stroller of claim 2, wherein each of said first and second coupling members further comprise:
    a) a second connection member having first and second opposing ends, wherein said second connection member is angled when said first and second coupling members are in said first operational position;
    b) wherein each of said first ends of each said second connection member have a first transverse pivot aperture therein, wherein each of said first pivot apertures of said second connection member are disposed in operative alignment with said second frame aperture, wherein a first locking pin is disposed in said first pivot and second frame apertures, so that said second connection members can be removably secured to said frame member; and,
    c) wherein each of said second ends of each said second connection member has a second transverse pivot aperture therein, wherein each of said second pivot apertures of said second connection member mate with said third pivot aperture of said first connection member so as to be in operative alignment, wherein a second pivot pin is disposed in said second aperture of said second connection member and said third aperture of said first connection member, wherein said second connection member can pivot on said second pivot pin.

4. The baby stroller of claim 3, wherein each of said first pivot apertures disposed on said first end of said second connection member mates with said third frame aperture so as to be in operative alignment when said first and second coupling members are in said second stowed position, wherein a second locking pin is disposed in said first pivot aperture of said second connection member and said third frame aperture, wherein said first end of said second connection member can be removably secured to said frame member.

5. The baby stroller of claim 4, wherein said first end of said second connection member is adapted to slide along said frame members as said first and second coupling members are moved from said first operational position to said second stowed position.

6. The baby stroller of claim 5, wherein said first and second connection members each have a cavity therein extending longitudinally along said members, wherein said first and second connection members are adapted so that said cavities partially receive said corresponding frame members therein when said first and second connection members are in said second stowed position.

7. The baby stroller of claim 6, wherein said securing pin further comprises a coiled spring being disposed thereon so that said coiled spring is adapted to urge said securing pin away from said corresponding apertures of said first connection member to assist in removing the securing pin from the corresponding aperture of the first connection member.

\* \* \* \* \*